(12) United States Patent
Michels

(10) Patent No.: US 11,305,496 B2
(45) Date of Patent: Apr. 19, 2022

(54) SYSTEM AND METHOD FOR APPLYING A FASTENING MATERIAL TO A SUBSTRATE

(71) Applicant: Kellogg Company, Battle Creek, MI (US)

(72) Inventor: John Joseph Michels, Portage, MI (US)

(73) Assignee: Kellogg Company, Battle Creek, MI (US)

( * ) Notice: Subject to any disclaimer, the term of this patent is extended or adjusted under 35 U.S.C. 154(b) by 0 days.

(21) Appl. No.: 16/985,374

(22) Filed: Aug. 5, 2020

(65) Prior Publication Data
US 2020/0361157 A1 Nov. 19, 2020

Related U.S. Application Data

(62) Division of application No. 15/582,904, filed on May 1, 2017, now Pat. No. 10,766,205.

(Continued)

(51) Int. Cl.
*B29C 65/74* (2006.01)
*B65B 61/18* (2006.01)
(Continued)

(52) U.S. Cl.
CPC .......... *B29C 65/7443* (2013.01); *B29C 65/08* (2013.01); *B29C 65/4835* (2013.01);
(Continued)

(58) Field of Classification Search
CPC . B29C 65/7443; B29C 65/08; B29C 65/4835; B29C 66/472; B65B 61/188;
(Continued)

(56) References Cited

U.S. PATENT DOCUMENTS

| 4,709,398 A | 11/1987 | Ausnit |
| 4,795,510 A | 1/1989 | Witrrock et al. |

(Continued)

FOREIGN PATENT DOCUMENTS

| CN | 1266006/1190348 | 9/2000 |
| CN | 101959436 A | 1/2011 |

(Continued)

OTHER PUBLICATIONS

PCT/US2017/030357 International Search Report dated Sep. 7, 2017.

*Primary Examiner* — Jacob T Minskey
*Assistant Examiner* — S. Behrooz Ghorishi
(74) *Attorney, Agent, or Firm* — Honigman LLP; Kathryn D. Doyle, Esq.; Jonathan P. O'Brien

(57) ABSTRACT

A system for applying a fastening material to a substrate is provided. The system may include a first material source including the substrate. The substrate may define a first length extending from a first edge to a second edge and the first material source may feed the substrate in a first direction transverse to the first length. The system may additionally include a second material source including the fastening material. The fastening material may define a second length extending from a third edge to a fourth edge, whereby the second length is substantially equal to the first length and the second material source feeds the fastening material in a second direction transverse to the second length. The system may also include an applicator system that secures the fastening material to the substrate.

7 Claims, 7 Drawing Sheets

Related U.S. Application Data

(60) Provisional application No. 62/330,390, filed on May 2, 2016.

(51) Int. Cl.
| | | |
|---|---|---|
| *B31B 70/81* | (2017.01) | |
| *B29C 65/08* | (2006.01) | |
| *B29C 65/48* | (2006.01) | |
| *B29C 65/00* | (2006.01) | |
| *B65D 33/24* | (2006.01) | |
| *B65D 85/00* | (2006.01) | |
| *B29L 31/00* | (2006.01) | |

(52) U.S. Cl.
CPC ........ *B29C 66/472* (2013.01); *B31B 70/8123* (2017.08); *B31B 70/8133* (2017.08); *B65B 61/188* (2013.01); *B65D 33/24* (2013.01); *B65D 85/70* (2013.01); *B29L 2031/7128* (2013.01)

(58) Field of Classification Search
CPC . B31B 70/8133; B31B 70/8123; B65D 33/24; B65D 85/70; B29L 2031/7128
See application file for complete search history.

(56) References Cited

U.S. PATENT DOCUMENTS

| | | |
|---|---|---|
| 4,878,987 A | 11/1989 | Ven Erden |
| 6,167,597 B1 | 1/2001 | Malin |
| 6,782,648 B1 | 8/2004 | Mosher, Jr. |

FOREIGN PATENT DOCUMENTS

| | | | | |
|---|---|---|---|---|
| CN | 102300528 A | | 12/2011 | |
| DE | 102014110853 | | 2/2016 | |
| DE | 102014110853 A1 | * | 2/2016 | ......... B65D 33/2525 |
| JP | 2007-518606 A | | 7/2007 | |
| JP | 2012-086491 A | | 5/2012 | |
| JP | 2012086491 A | * | 5/2012 | |
| WO | 2016061106 | | 4/2016 | |

* cited by examiner

SYSTEM AND METHOD FOR APPLYING A FASTENING MATERIAL TO A SUBSTRATE

CROSS REFERENCE TO RELATED APPLICATION

This application is a divisional of U.S. patent application Ser. No. 15/582,904, filed May 1, 2017, which claims the benefit of and priority under 35 U.S.C. § 119(e) to U.S. Provisional Application No. 62/330,390, filed on May 2, 2016, both of which are incorporated herein by reference in their entirety.

FIELD

The present disclosure relates generally to a system and method for applying a fastening material to a substrate, and more particularly to a system and method for applying a re-closable fastening material to a packaging substrate.

BACKGROUND

This section provides background information related to the present disclosure and is not necessarily prior art.

Packages and containers, such as bags and pouches, often utilize a fastening system disposed along one or more edges of the package to allow an end user to access the package. For example, various foodstuff packages often utilize a re-closable fastening system disposed along an edge of the package to allow an end user to access and reclose the package.

While such fastening systems adequately permit a user to access and reclose a package, application of such fastening systems to a package can be time consuming and, as a result, costly. For example, systems and methods for applying conventional fastening systems to a substrate often require metering a quantity of fastening material that is equal to a length of the opening in the package. Further, such fastening material typically also includes flanges disposed on opposite sides of a working portion of the fastening system that permits a machine to grip and feed the fastening material into a desired position during manufacturing of the package. The added manufacturing steps and increased material required to form the flanges add to the processing time required to manufacture the package and, therefore, increase the overall cost of the product.

SUMMARY

This section provides a general summary of the disclosure, and is not a comprehensive disclosure of its full scope or all of its features.

In one configuration, a system for applying a fastening material to a substrate is provided. The system may include a first material source including the substrate. The substrate may define a first length extending from a first edge to a second edge and the first material source may feed the substrate in a first direction transverse to the first length. The system may additionally include a second material source including the fastening material. The fastening material may define a second length extending from a third edge to a fourth edge, whereby the second length is substantially equal to the first length and the second material source feeds the fastening material in a second direction transverse to the second length. The system may also include an applicator system having a cutting block and a seal head. The cutting block may have a cutting mechanism defining a third length substantially equal to the first length and the seal head may define a fourth length substantially equal to the first length. The cutting block and the seal head may secure the fastening material to the substrate such that the first edge is aligned with the third edge and the second edge is aligned with the fourth edge.

In one configuration, the first material source includes a first axis of rotation and the second material source includes a second axis of rotation. The first length may extend in a direction substantially parallel to the first axis of rotation and the second length may extend in a direction substantially parallel to the second axis of rotation.

The fastening material may define a width extending in a direction perpendicular to the second length, whereby the width is less than the second length. Specifically, the width may be between 1% and 10% of the second length.

In one configuration, the fastening material includes a first portion of a self-engaging fastener. For example, the self-engaging fastener may include one of a hook-type fastener and a loop-type fastener.

The cutting block and the seal head may secure the fastening material to the substrate using at least one of ultrasonic welding and an adhesive.

A method of applying a fastening material to a substrate is provided and may include feeding the substrate in a first direction, whereby the substrate defines a first length extending perpendicular to the first direction from a first edge to a second edge. The method may additionally include feeding the fastening material in a second direction substantially parallel to the first direction, whereby the fastening material defines a second length that extends perpendicular to the second direction and is substantially equal to the first length. A portion of the fastening material defining a length substantially equal to the first length may be removed. The portion of the fastening material may be secured to the substrate such that the portion extends from the first edge to the second edge.

In one configuration, feeding the substrate in the first direction may include rotating a first material source about a first axis of rotation and feeding the fastening material in the second direction includes rotating a second material source about a second axis of rotation that is substantially parallel to the first axis.

Removing the portion of the fastening material may include cutting the fastening material with a cutting mechanism that has a length greater than or equal to the first length of the substrate.

In one configuration, securing the portion of the fastening material to the substrate may include ultrasonically welding the fastening material to the substrate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1:
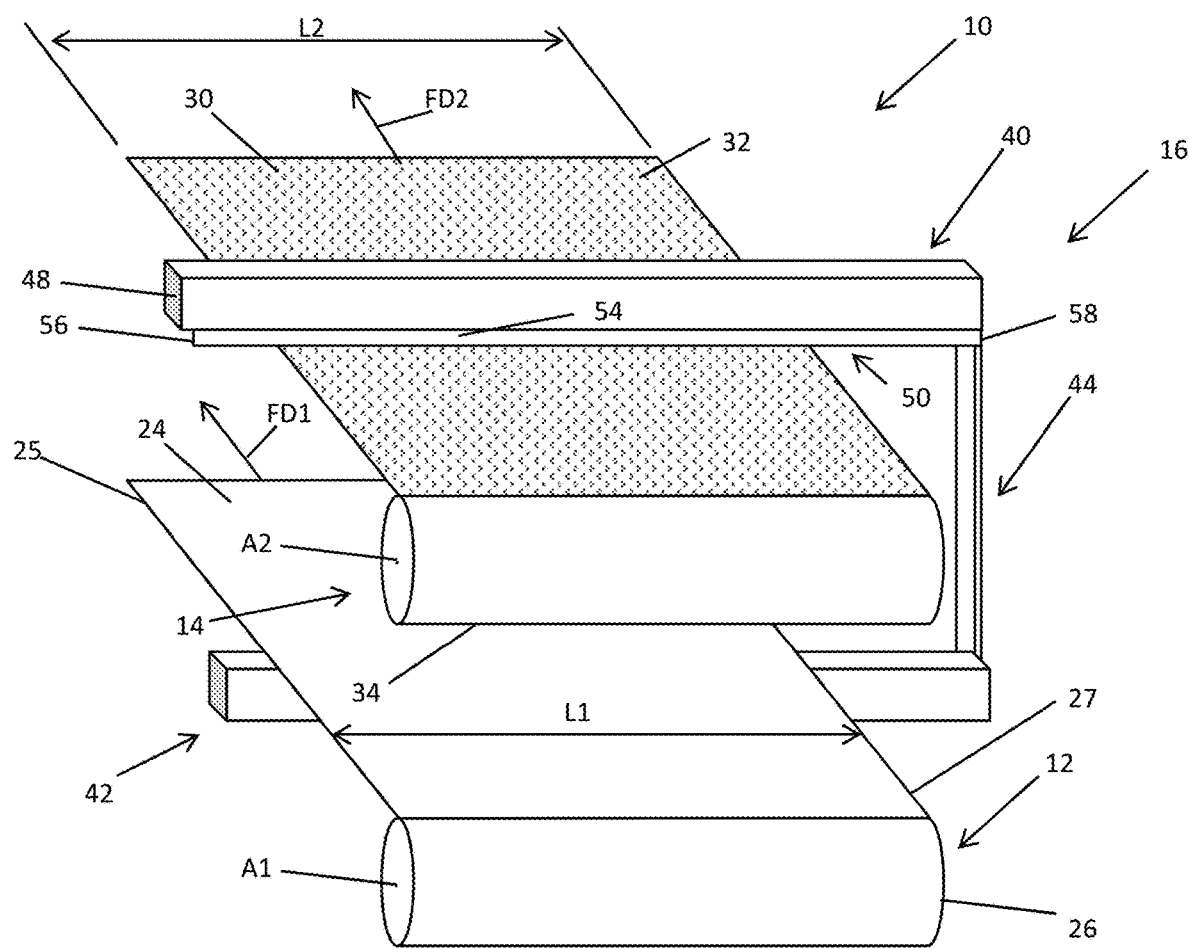
FIG. 1 is a perspective view of a system for applying a fastening material to a substrate in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

With reference to FIGS. 1-3D, a package assembly system 10 is provided and may include a first material source 12, a second material source 14, and an applicator system 16. As will be described in more detail below, the package assembly system 10 may be configured to produce a package 18 (FIG. 4) from the first material source 12 and the second material source 14. For example, the package 18 may be a container such as a plastic bag or pouch used to store various items such as foodstuffs, for example. In this regard the package 18 may include an opening 20 extending along a width W1 of the package 18. In this regard, the width W1 may extend from a first sealed seam 22 to a second sealed seam 23 opposite, and/or extending substantially parallel to, the first sealed seam 22. In some configurations, the package 18 may be a re-closable package, such that an end user can selectively open and close the opening 20. For example, material from the second material source 14 may be applied proximate to the opening 20, and along the width W1 of the package 18, such that the end user can open and reclose the opening 20 by engaging the material from the second material source 14 with at least one of the material from the first material source 12 and a material from a third material source (not shown). In some configurations, the material from the second material source 12 may be coupled to a mating material from the third material source in order to close and reclose the opening 20.

The first material source 12 may include a first material 24 forming a polymer substrate. For example, and in some configurations, the first material 24 may include a polyolefin substrate. The first material 24 may define a length L1 extending from a first lateral edge 25 to a second lateral edge 27 opposite the first lateral edge 25. The length L1 may correspond to the width W1 of the package 18. For example, the length L1 of the first material 24 may be substantially equal to the width W1 of the package 18. In this regard, the first lateral edge 25 of the first material 24 may correspond to the first sealed seam 22 of the package 18, and the second lateral edge 27 of the first material 24 may correspond to the second sealed seam 23 of the package 18, such that the opening 20 of the package 18 extends in a direction corresponding to the length L1 of the first material 24.

The first material 24 may be disposed on or within the first material source 12 in a variety of configurations. For example, in some configurations, the first material source 12 may include a roll 26 of the first material 24. In this regard, the length L1 of the first material 24 may correspond to the length of the roll 26. In other configurations, the first material source 12 may include a stack, pile, or other suitable arrangement of the first material 24, such that the length L1 of the first material 24 corresponds to a length of the arrangement of the first material 24 within the first material source 12 (i.e., a stack of the first material 24 would have a length L1).

Figure 2:
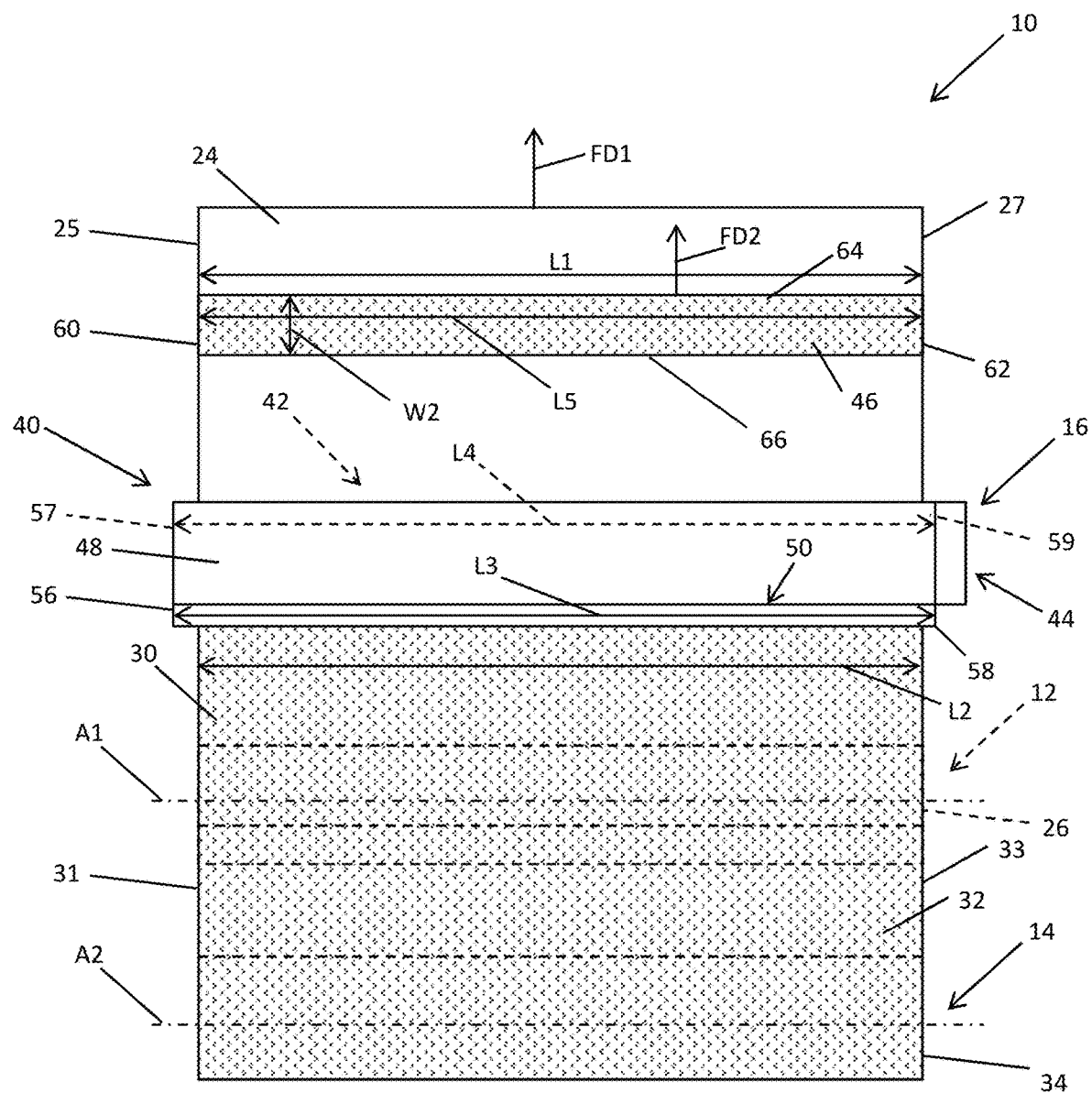
FIG. 2 is a top view of the system of FIG. 1.

As described, the first material source 12 may feed the first material 24 from the first material source 12 in a first feed direction FD1. As illustrated in FIG. 2, the first feed direction FD1 may be transverse to the length L1 of the first material 24. For example, the first feed direction FD1 may be substantially orthogonal (+/−5 degrees) to the length L1. As previously described, in some configurations, the first material 24 may be disposed on the roll 26. Accordingly, the first material 24 may be fed in the first feed direction FD1 by rotating the roll 26 about a first axis of rotation A1. As illustrated in FIG. 2, the first axis of rotation A1 may be generally parallel (+/−5 degrees) to the length L1 of the first material 24 and generally orthogonal (+/−5 degrees) to the first feed direction FD1.

The second material source 14 may include a second material 30. The second material 30 may include any variety of suitable fastening material. In some configurations, the second material 30 may include a self-engaging fastener 32 that is configured to mate with a similarly-styled self-engaging fastener (not shown). While the second material 30 is shown and described herein as including a hook-shaped, self-engaging fastener 32, configured to mate with a similar hook-shaped, self-engaging fastener, the second material 30 may include other types of self-engaging fasteners within the scope of the present disclosure. For example, the second material 30 may include a loop-shaped, self-engaging fastener, a mushroom-shaped self-engaging fastener, or a zipper-type self-engaging fastener. In this regard, in some configurations the second material 30 may include any form of VELCRO® self-engaging fastener sold by Velcro USA, Inc.

The second material 30 may define a length L2 extending from a first lateral edge 31 to a second lateral edge 33 opposite the first lateral edge 31. The length L2 may correspond to the width W1 of the package 18. For example, the length L2 of the second material 30 may be substantially equal to the width W1 of the package 18. In this regard, the length L2 of the second material 30 may be substantially equal (+/−10%) to the length L1 of the first material 24. The opening 20 of the package 18 may extend in a direction corresponding to the length L2 of the second material 30.

The second material 30 may be disposed on or within the second material source 14 in a variety of configurations. For example, in some configurations, the second material source 14 may include a roll 34 of the second material 30. In this regard, the length L2 of the second material 30 may correspond to the length of the roll 34. Accordingly, the length of the roll 34 of second material 30 may be substantially equal to the length of the roll 26 of first material 24. In other configurations, the second material source 14 may include a stack, pile, or other suitable arrangement of the second material 30, such that the length L2 of the second material 30 corresponds to a length of the arrangement of the second material 30 within the second material source 14 (i.e., a stack of the second material 30 would have a length L2).

As described, the second material source 14 may feed the second material 30 from the second material source 14 in a second feed direction FD2. As illustrated in FIG. 2, the second feed direction FD2 may be transverse to the length L2 of the second material 26. For example, the second feed direction FD2 may be substantially orthogonal (+/−5 degrees) to the length L2. In this regard, the second feed direction FD2 may be substantially parallel to the first feed direction FD1. As previously described, in some configurations, the second material 30 may be disposed on the roll 34. Accordingly, the second material 30 may be fed in the second feed direction FD2 by rotating the roll 34 about a second axis of rotation A2. As illustrated in FIG. 2, the second axis of rotation A2 may be generally parallel (+/−5 degrees) to the length L2 of the second material 30 and generally orthogonal (+/−5 degrees) to the second feed direction FD2.

The applicator system 16 may include a cutting block 40, a seal head 42, and a drive mechanism 44. As will be explained in more detail below, the applicator system 16 may be configured to remove a portion 46 (FIGS. 3B-4) of the second material 30 and apply the portion 46 of the second material 30 to the first material 24.

The cutting block 40 may include coupling mechanism 48 and a cutting mechanism 50. The coupling mechanism 48 may include any variety of mechanism configured to engage and selectively secure the second material 30. For example, the attachment mechanism 48 may include an adhesive, a suction source, or a mechanical fastener(s) that engages and secures the second material 30 to the cutting block 40. In some configurations, the coupling mechanism 48 may include a self-engaging fastener (not shown) that engages the self-engaging fastener 32 of the second material 30.

The cutting mechanism 50 may include a blade 54 that selectively engages and cuts the second material 30. As illustrated in FIG. 2, the blade 54 may define a length L3 extending from a proximal end 56 to a distal end 58. In this regard, the blade 54 may extend in a direction substantially perpendicular to the first and second lateral edges 25, 27 of the first material 24, and generally parallel to the opening 20 of the package 18. The length L3 may be equal to or greater than the length L1 of the first material 24 and the length L2 of the second material 30.

The seal head 42 may selectively engage the first material 24. As illustrated in FIG. 2, the seal 42 may define a length L4 extending from a proximal end 57 to a distal end 59. In this regard, the seal head 42 may extend in a direction substantially perpendicular to the first and second lateral edges 25, 27 of the first material 24, and generally parallel to the opening 20 of the package 18. The length L4 may be equal to or greater than the length L1 of the first material 24 and the length L2 of the second material 30.

As illustrated in FIGS. 3A-3D, the drive mechanism 44 may include any variety of drive mechanism that translates the cutting block 40 in a first direction D1 and/or a second direction D2. Additionally or alternatively, the drive mechanism 44 may translate the seal head 42 in the first direction D1 and/or a third direction D3. For example, the drive mechanism 44 may include a gear train, a belt-drive system, or a hydraulic drive mechanism (none shown) that translates the cutting block 40 and/or the seal head 42 in one or more of the first, second, and third directions D1, D2, D2. In particular, the drive mechanism 44 may translate the cutting block 40 and/or the seal head 42 toward the first and/or second materials 24, 30. In this regard, the first direction D1 may be substantially parallel to the first and second feed directions FD1, FD2, and the second and third directions D2, D3 may be substantially perpendicular to the first and second feed directions FD1, FD2.

Figure 3A:
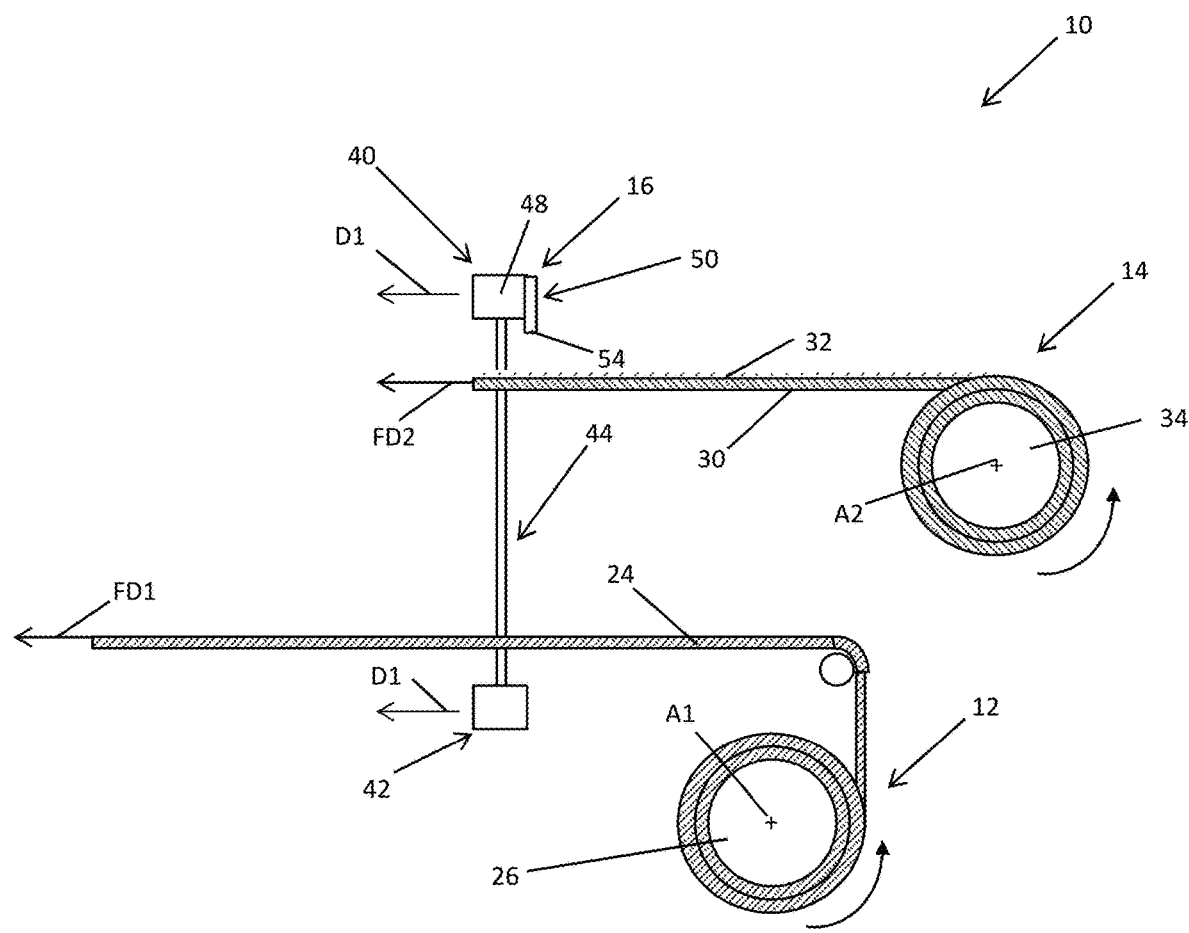
FIG. 3A is a side view of the system of FIG. 1 in a first stage of operation.

With reference to FIGS. 3A-3D, a method of applying the second material 30 to the first material 24 will now be described. As illustrated in FIG. 3A, the method may include feeding the first and/or second materials 24, 30 in the first and second feed directions FD1, FD2, respectively. In this regard, the first stage of operation may include rotating the first roll 26 about the first axis of rotation A1 and/or rotating the second roll 34 about the second axis of rotation A2.

Figure 3B:
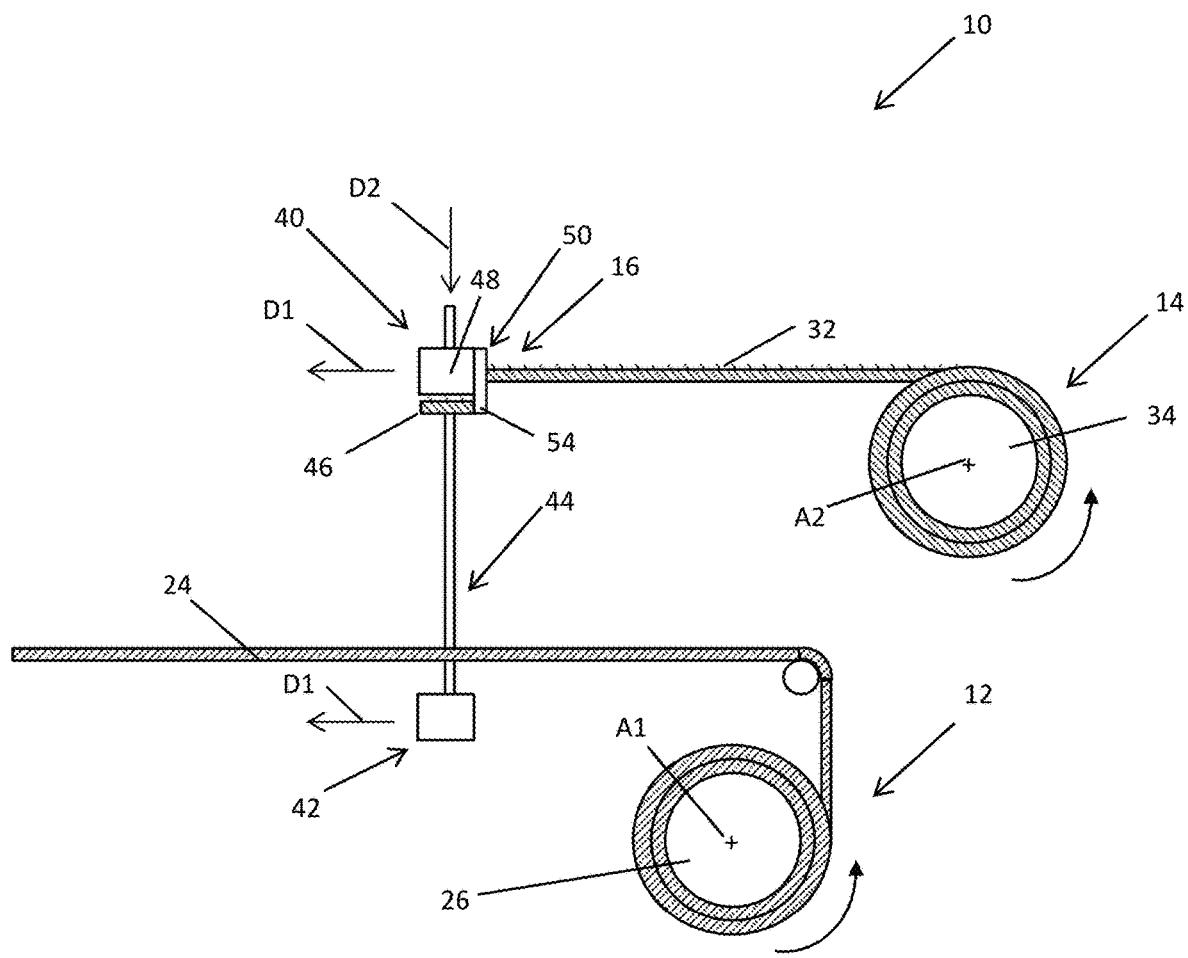
FIG. 3B is a side view of the system of FIG. 1 in a second stage of operation.

With reference to FIG. 3B, the method may also include translating the cutting block 40 relative to the second material 30 and/or translating the seal head 42 relative to the first material 30. For example, the method may include translating the cutting block 40 in the first and/or second directions D1, D2, and/or translating the seal head 42 in the first and/or third directions D1, D3. In particular, the method may include translating the cutting block 40 in the second direction D2 such that the blade 54 engages and cuts the second material 30 and the coupling mechanism 48 engages and secures the second material 30. In this regard, the coupling mechanism 48 may engage and secure the portion 46 of the second material 30. As illustrated in FIG. 2, the portion 46 may include a length L5 extending from a first lateral edge 60 to a second lateral edge 62 opposite the first lateral edge 60, and a width W2 extending from a proximal end 64 to a distal end 66 opposite the proximal end 64. Relative to the package 18, the width W2 may extend in a direction substantially perpendicular to the opening 20 of the package 18, and substantially parallel to the first and second sealed seams 22, 23 of the package 18. The length L5 may be substantially equal to the length L1 of the first material 24. In this regard, the length L5 may be substantially equal to the width W1 of the opening 20 of the package 18. The width W2 of the portion 46 may be between 1% and 10% of the length L5 of the portion. In some configurations, the width W2 may be substantially equal to 5% of the length L5.

Figure 3C:
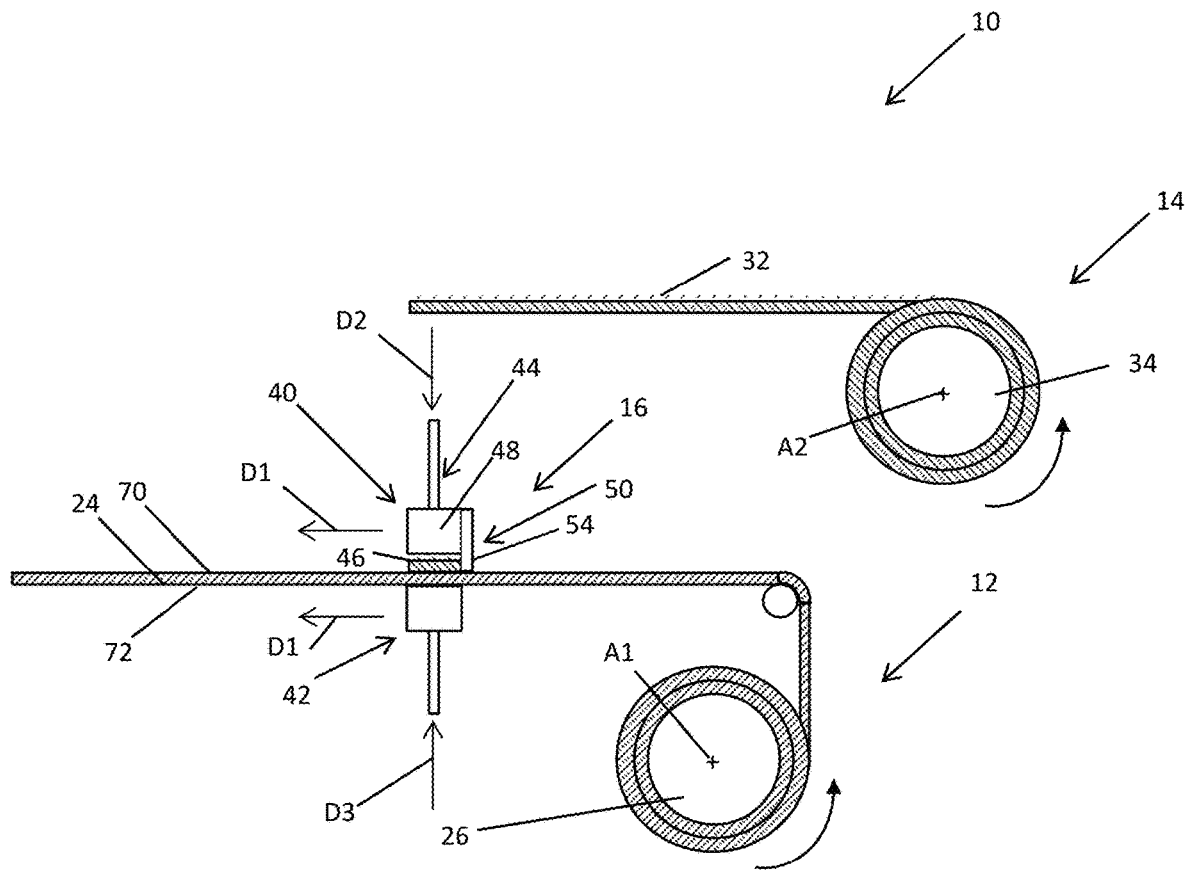
FIG. 3C is a side view of the system of FIG. 1 in a third stage of operation.

As illustrated in FIG. 3C, the method may also include translating the cutting block 40, including the portion 46 of the second material 30, relative to the first material 24. For example, the method may include translating the cutting block 40 in the first and/or second directions D1, D2 and may further include placing the portion 46 of the second material 30 into engagement with the first material 24. In this regard, the method may include engaging the portion 46 with a first side 70 of the first material 24 and engaging the seal head 42 with a second side 72 of the first material 24, where the first side 70 is opposite the second side 72. Accordingly, the first material 24 and the portion 46 of the second material 30 may be clamped by and disposed between the cutting block 40 and the seal head 42.

The method may also include securing the portion 46 of the second material 30 relative to the first material 24. For example, the method may include fastening the portion 46 to the first material 24 using one or more of a variety of techniques. In some configurations, the method may include transmitting ultrasonic wave energy into one or both of the portion 46 and the first material 24 through one or both of the cutting block 40 and the seal head 42 in order to ultrasonically weld the first material 24 to the portion 46. In other configurations, the method may include activating an adhesive by applying heat to one or both of the portion 46 and the first material 24 through one or both of the cutting block 40 and the seal head 42 in order to fasten the first material 24 to the portion 46.

Figure 3D:
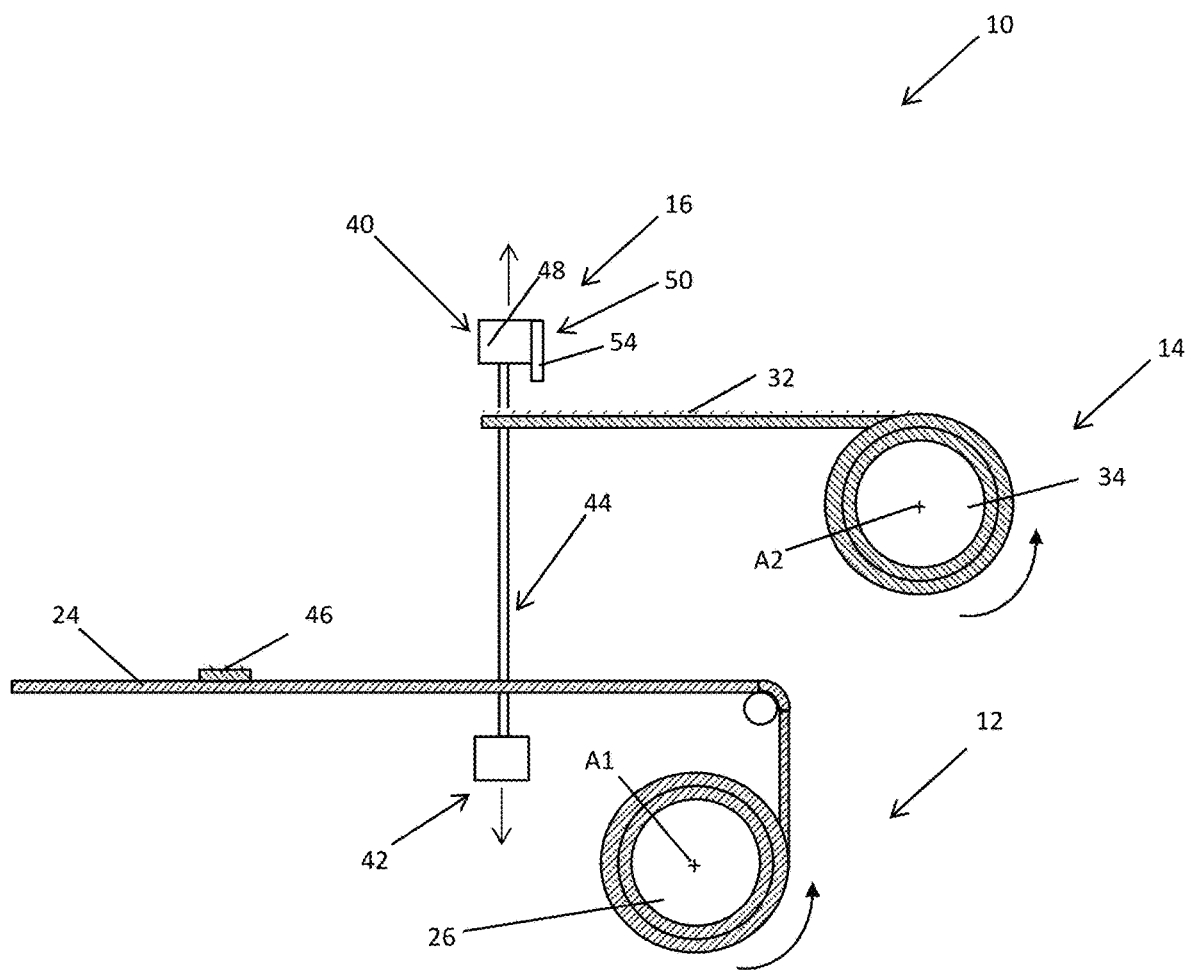
FIG. 3D is a side view of the system of FIG. 1 in a fourth stage of operation.

With reference to FIG. 3D, upon securing the portion 46 to the first material, the method may include translating the cutting block 40 relative to the second material 30 and/or translating the seal head 42 relative to the first material 30. For example, the method may include translating the cutting block 40 in a direction opposite the first and/or second directions D1, D2, and/or translating the seal head 42 in a direction opposite the first and/or third directions D1, D3. In particular, the method may include translating the cutting block 40 toward the second material source 14 and/or translating the seal head 42 toward the first material source 12.

Figure 4:
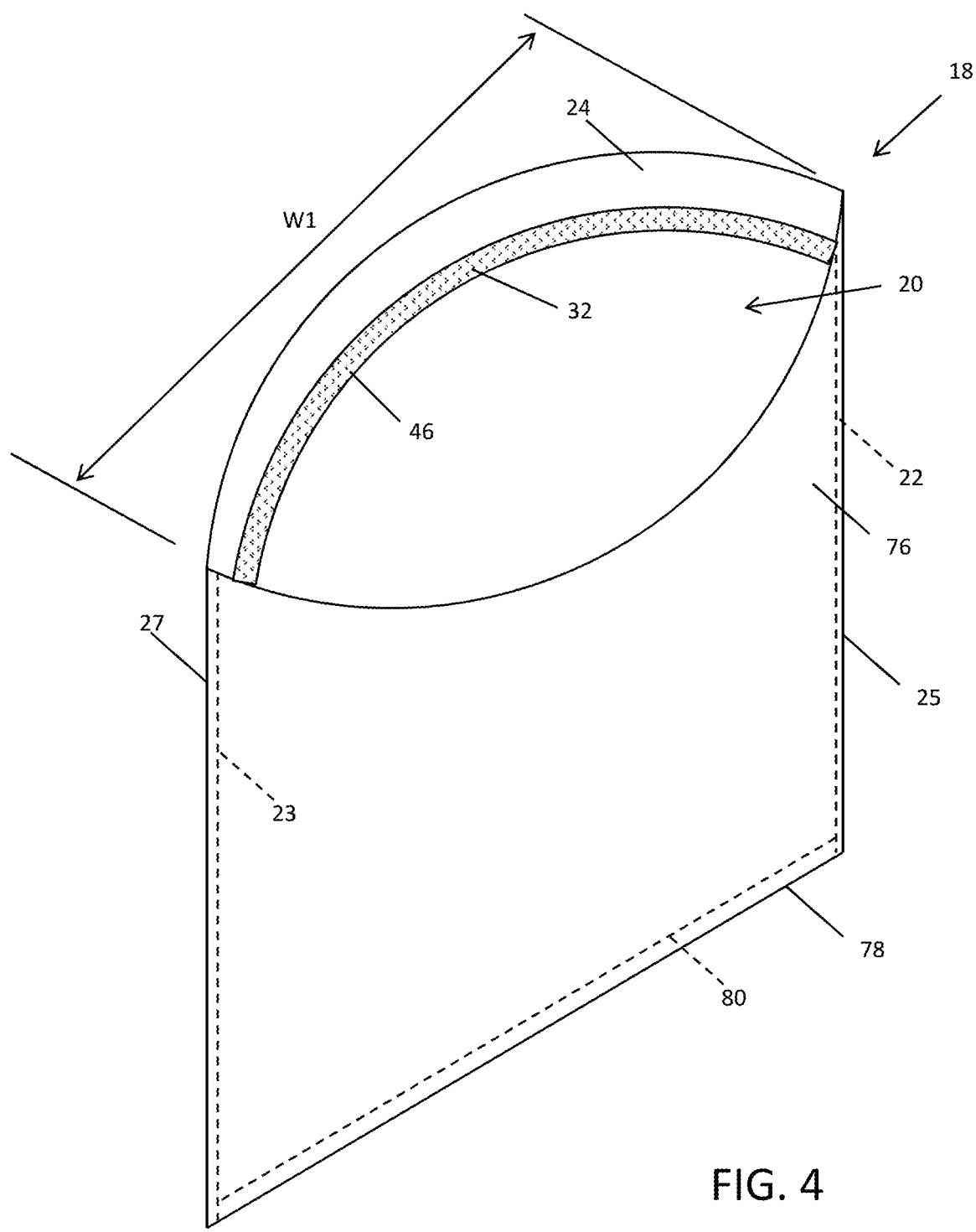
FIG. 4 is a perspective view of a package formed by the system of FIG. 1.

With reference to FIG. 4, the method may also include securing a third material 76 to the first material 24. For example, the method may include securing the third material 76 to the first material 24 along one or more of the first lateral edge 25, the second lateral edge 27, and a bottom edge 78 of the first material 24, to form the first sealed seam 22, the second sealed seam 23, and a third sealed seam 80, respectively, of the package 18. In this regard, the opening 20 of the package 18, and the width W2 of the portion 46 of the second material 30, may extend in a direction substantially parallel to the third sealed seam 80, and substantially perpendicular to the first and second sealed seams 22, 23. While not specifically shown, the third material 76 may similarly receive a portion of a fastener that mates with the second material 30. For example, if the second material 30 is a hook-type fastener, a loop-type fastener may be applied to the third material 76 to allow the loop-type fastener to engage the hook-type fastener to allow a user to selectively reclose the opening 20 of the package 18. The loop-type fastener may be applied to the third material 76 using the process described above for attaching the hook-type fastener (i.e., the second material 30) to the first material 24. While the first material 24 is described as receiving a hook-type fastener and the third material 76 is described as receiving a loop-type fastener, the first material 24 could alternatively receive the loop-type fastener and the third material 76 could receive the hook-type fastener.

By cutting the second material 32 such that the portion 46 has a width W2 and a length L5 extending in the directions and having the proportions described, the system 10 and method described herein are able to greatly reduce the amount of time required to manufacture the package 18. For example, by measuring a width W2 of the portion 46 that is less than the length L5 and that extends in a direction substantially parallel to the first and second lateral edges 25, 27 of the first material 24, the system 10 and corresponding method are able to rapidly manufacture the package 18. That is, for example, the methods and systems of the present application define an index or metering length in the direction FD2 of the fastening material 30 off the second material source 14 that is the width W2 of the portion 46. In some approaches, this metering length is about 0.25 to about 1 inch long, and in other approaches, about 0.25 to about 0.5 inches long. This is in contrast to prior systems that required metering the entire length L2 of the fastener material in a direction transverse to the feed directions of the package substrate. In other approaches, the systems and materials herein enable the fastening material 32 to be flangeless or free of any flanges (or other areas of non-fastening material—that is material without hook and loop type fasteners, for instance) on opposing sides of the cut fastener portion 46.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system for applying a fastening material to a substrate, the system comprising:
a first material source including the substrate, the substrate defining a first length extending from a first edge to a second edge, the first material source configured to feed the substrate in a first direction transverse to the first length;
a second material source including the fastening material, the fastening material defining a second length extending from a third edge to a fourth edge, the second length substantially equal to the first length, the second material source configured to feed the fastening material in a second direction transverse to the second length; and an applicator system having a cutting block and a seal head, the cutting block having a cutting mechanism defining a third length substantially equal to the first length, the seal head defining a fourth length substantially equal to the first length, the cutting block and the seal head configured to secure the fastening material to the substrate such that the first edge is aligned with the third edge and the second edge is aligned with the fourth edge, and wherein the cutting block is configured to translate in the first direction and in another direction transverse to the first direction.

2. The system of claim 1, wherein the first material source includes a first axis of rotation and the second material source includes a second axis of rotation, the first length extending in a direction substantially parallel to the first axis of rotation, the second length extending in a direction substantially parallel to the second axis of rotation.

3. The system of claim 1, wherein the fastening material defines a width extending in a direction perpendicular to the second length, the width being less than the second length.

4. The system of claim 3, wherein the width is between 1% and 10% of the second length.

5. The system of claim 1, wherein the fastening material includes a first portion of a self-engaging fastener.

6. The system of claim 5, wherein the self-engaging fastener includes one of a hook-type fastener and a loop-type fastener.

7. The system of claim 1, wherein the cutting block and the seal head are configured to secure the fastening material to the substrate using at least one of ultrasonic welding and an adhesive.

* * * * *